United States Patent
Jonsson et al.

(10) Patent No.: US 8,385,965 B2
(45) Date of Patent: *Feb. 26, 2013

(54) METHOD AND DEVICE FOR POWER CONTROL

(75) Inventors: Elias Jonsson, Malmö (SE); Johan Nilsson, Höllviken (SE); Rama Kumar Mopidevi, Malmö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 982 days.

This patent is subject to a terminal disclaimer.

(21) Appl. No.: 11/721,938

(22) PCT Filed: Dec. 15, 2005

(86) PCT No.: PCT/EP2005/056824
§ 371 (c)(1),
(2), (4) Date: Dec. 5, 2009

(87) PCT Pub. No.: WO2006/067082
PCT Pub. Date: Jun. 29, 2006

(65) Prior Publication Data
US 2010/0087219 A1 Apr. 8, 2010

Related U.S. Application Data

(60) Provisional application No. 60/638,268, filed on Dec. 21, 2004.

(30) Foreign Application Priority Data
Dec. 20, 2004 (EP) .................................... 04030133

(51) Int. Cl.
*H04B 7/00* (2006.01)

(52) U.S. Cl. ........................... 455/522; 455/69; 455/135
(58) Field of Classification Search .................. 455/522, 455/67.11, 68–70, 115.3, 126, 127.1, 127.2, 455/135, 226.3, 277.2, 296; 370/318
See application file for complete search history.

(56) References Cited

U.S. PATENT DOCUMENTS 6,493,541 B1 * 12/2002 Gunnarsson et al. ........... 455/69
6,597,923 B1 * 7/2003 Vanghi et al. .................. 455/522
(Continued)

FOREIGN PATENT DOCUMENTS

| EP | 1 111 825 A2 | 6/2001 |
|---|---|---|
| EP | 1 480 350 A1 | 11/2004 |
| GB | 2 393 359 A | 3/2004 |

OTHER PUBLICATIONS

PCT International Search Report, mailed Jan. 30, 2006, in connection with International Application No. PCT/EP2005/056824.

*Primary Examiner* — Dominic E Rego
(74) *Attorney, Agent, or Firm* — Potomac Patent Group PLLC (57) ABSTRACT

A method for generating a filtered signal quality value used in a power control system of a wireless communication apparatus. An estimated signal quality value of a received signal is generated. A filtered signal quality value is generated based on the estimated signal quality value. The filtered signal quality value is generated in dependence of at least one of registering a difference between a first and a second reference signal quality value, and a change in transmitted power of said received signal. A power control device comprising a signal quality estimator, a BLER estimator, a regulator, and an inner loop is configured to implement the method.

28 Claims, 5 Drawing Sheets

U.S. PATENT DOCUMENTS

| | | |
|---|---|---|
| 7,734,257 B2 * | 6/2010 | Chen et al. ..................... 455/69 |
| 2003/0083088 A1 * | 5/2003 | Chang et al. .................. 455/522 |
| 2004/0058699 A1 | 3/2004 | Jonsson et al. |
| 2004/0137860 A1 | 7/2004 | Oh et al. |
| 2005/0094816 A1 * | 5/2005 | Lindoff et al. ................ 380/268 |
| 2005/0152279 A1 * | 7/2005 | Robertson et al. ............ 370/252 |
| 2006/0189342 A1 * | 8/2006 | Chi et al. ..................... 455/522 |

* cited by examiner (Prior Art)

METHOD AND DEVICE FOR POWER CONTROL

CROSS-REFERENCE TO RELATED APPLICATIONS

This application claims the benefit of U.S. Provisional Application No. 60/638,268, filed Dec. 21, 2004, which is hereby incorporated herein by reference in its entirety. This application also claims priority under 35 U.S.C. §119 to European Patent Application No. 04030133.5, filed Dec. 20, 2004, which is hereby incorporated herein by reference in its entirety.

TECHNICAL FIELD OF THE INVENTION

The present invention generally relates to a method for power control in a wireless communication apparatus for operation in a wireless communication system, and more specifically to a method for generating a filtered signal quality value used in a power control system of a wireless communication apparatus. The invention also relates to a power control device configured to implement the method according to the invention.

DESCRIPTION OF RELATED ART

Figure 1:
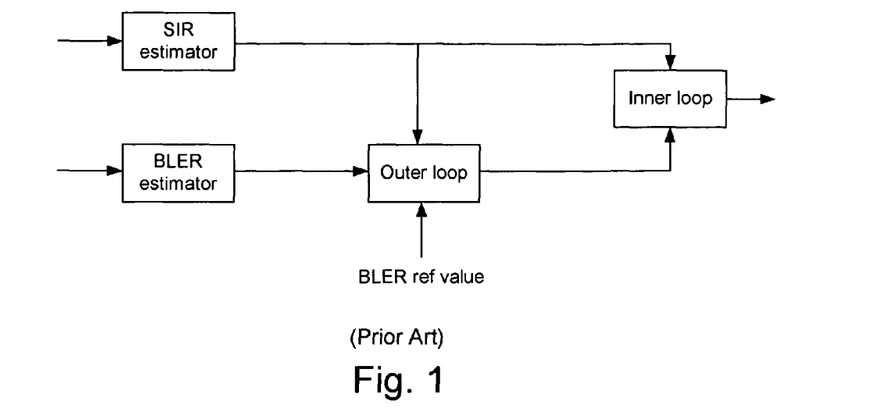
FIG. 1 is a block diagram of a power control device according to the prior art.

An example of a power control device of a base station or an UE (User Equipment) for a communication uplink or downlink in a wireless communication system, such as a WCDMA (Wide Band Code Division Multiple Access) communication system, is shown in FIG. 1. An outer control loop sets a reference signal-to-interference value ($SIR_{ref}$) based on the deviation of an estimated block error rate (BLER) from a reference block error rate. The estimated BLER may be provided by a BLER estimator. In turn an inner loop compares an estimated signal-to-interference value ($SIR_{est}$) to $SIR_{ref}$, which results in a request, which is issued by the UE or the base station as a TPC (Transmit Power Control) command, to increase the transmitted power of a signal transmitted from a base station if $SIR_{est}$ is below $SIR_{ref}$, and vice versa.

In a wireless communication system, the power of the received signal may not follow or change in complete accordance with the TPC command for different reasons. For example, in a congested system, the base-station might not be able to grant the UE the requested change in transmitted power. This may not a problem when the cells are not congested with active users, but may be when they are. The outer loop sets the $SIR_{ref}$ so that the estimated block error rate is as close as possible to the reference block error rate. If the requested power increase is denied during a prolonged period of time, there is a risk that the average estimated block error rate is not kept close enough to the reference block error rate. Consequently, the outer loop will increase $SIR_{ref}$ to request an even larger increase of the transmitted power, not knowing that the base station is unable to grant an increased transmitted power. The result of this is that the outer loop will increase the reference SIR unnecessarily much, simply because the base-station does not give the requested power. This situation is referred to as windup.

A straightforward solution to the above mentioned problem would be to bind the absolute value of $SIR_{ref}$. In practice, however, it is difficult to find a narrow enough absolute range within which $SIR_{ref}$ is allowed to operate. Instead, $SIR_{ref}$ may be stopped from being updated if it deviates by a certain amount from a filtered estimated SIR value ($SIR_{filt}$). This procedure is referred to as an anti-windup procedure.

Such anti-windup methods can be found in US patent application no. 2004/0058699 and is of the type $$c_2 SIR_{ref} < SIR_{filt} < c_1 SIR_{ref} \tag{1}$$

where $SIR_{ref}$ is the reference SIR value for a given communication channel. It should be noticed that a $SIR_{ref}$ value is assigned for each transport channel. $SIR_{filt}$ denotes the filtered estimated SIR value, and $c_1$, $c_2$ are constants, where $c_1$ is larger than one and $c_2$ is less than one. Example values are and $c_2 \approx 1.5$, and $c_2 \approx 0.75$. The $SIR_{filt}$ value can be obtained, for example, from a first order recursive filter, such as a IIR filter, of the $SIR_{est}$ value, that is, $$SIR_{filt,n} = \lambda_{SIR\_out}(SIR_{est} - SIR_{filt,n-1}) + SIR_{filt,n-1} \tag{2}$$

for some filter constant $\lambda_{SIR\_out}$, where n is a current slot and n−1 is a previous slot. The $SIR_{filt}$ value generated according to (2) is thus a moving average value accounting for all previous $SIR_{est}$ values to some extent. If the condition in (1) is satisfied, no windup is present, because then the $SIR_{filt}$ value is said to track the $SIR_{ref}$ value correctly. Thus, the $SIR_{ref}$ value may be updated.

The constants $c_1$, $c_2$ should be chosen as close to one as possible to get an estimate that is as tight as possible. Assume for example, that the base-station cannot grant the requested power increase. Then, the statements in (1) will detect this as soon as the $SIR_{filt}$ value is a factor $c_2$ less than the $SIR_{ref}$ value. The sooner it is detected that the $SIR_{filt}$ value is not correctly tracking the $SIR_{ref}$ value, the sooner the updating of the $SIR_{ref}$ value can be stopped. As was said before, if the requested power is denied during a prolonged period of time, there is a risk that the average estimated block error rate will not be kept close to the reference block error rate. The result of this is that the outer loop will increase the $SIR_{ref}$ value unnecessarily much, simply because the base-station is not granting the requested power. The following detrimental effect will be the result of not stopping the updating of the $SIR_{ref}$ values:

Once the base-station can grant more power to a requesting UE, if possible, it will be at a too high $SIR_{ref}$ value for a prolonged period of time. A high $SIR_{ref}$ value gives an average estimated block error rate much lower than the reference block error rate. Then, 1) the correct quality of service is not fulfilled, and 2) the base-station resources are not utilized optimally, since too much power is allocated to the concerned UE.

The same kind of argument can be made when the base-station cannot grant the requested power decrease, which is, however, a more rare situation. In that case, a $SIR_{ref}$ value that is too low can be the result once the base-station can grant the requested power decrease, which may result in that the average estimated block error rate will be above the reference block error rate, in other words the quality of service is lost. In summary, the benefits of being able to detect as soon as possible when the filtered SIR value is not tracking the reference SIR value, is a higher capacity usage in the cell.

On the other hand, if the bounds are too tight in equation (1), the anti-windup statement generated according to (2) will not be passed, in case there is a discrepancy between the $SIR_{filt}$ value and the $SIR_{ref}$ value, and hence the outer loop power control will not update its $SIR_{ref}$ value, which could entail a slow response outer loop power control with the effect, in a worst case, of a lower capacity usage in the cell.

Due to non-linearities in practical receivers, challenging propagation channels, and/or a too slow inner loop update rate, a bias between the $SIR_{ref}$ and $SIR_{filt}$ values can quite often be observed. The bias is a difference between the two values, which may depend on non-linearities and may vary in size. The faster the UE is moving, the larger the bias will be and thus a larger problem with power utilization, as described above, will occur. Such a bias depends on the propagation channel, for example, ranging from nonexistent, when the UE is standing still, to 2 dB, when the UE is moving at 120 km/h. If the bias cannot be estimated, looser anti-windup bounds in equation (1) have to be used, leading to the above-mentioned problems. Also, a bias between the $SIR_{ref}$ and $SIR_{filt}$ values may lead to incorrect TPC commands, whereby the power resources of the communication system are not utilized in an optimal manner.

EP 1111825 discloses a method for controlling transmission power by averaging the received SIR over predetermined N slots and subtracting the reference SIR in order to determine if TPC commands should be positive or negative.

SUMMARY OF THE INVENTION

It is an object of the invention to provide a method and a power control device for using the power resources in a communication network more efficiently.

It is another object of the invention to provide a method and a power control device that allows tight anti-windup bounds.

It is a still another object of the invention to decrease the bias between a reference signal quality value and a filtered signal quality value, which allows the use of tight anti-windup bounds in order to enable fast anti windup detection and correctly generated power (TPC) commands.

According to a first aspect of the invention, the object is achieved by a method for generating a filtered signal quality value for use in a power control system of a wireless communication apparatus. The method comprises generating an estimated signal quality value of at least one received signal, and generating a filtered signal quality value based on the estimated signal quality value. The filtered signal quality value is generated in dependence of at least one of registering a difference between a first and a second reference signal quality value valid for a first and a second time period, respectively, of said at least one received signal, and a change in transmitted power of said received signal.

The step of registering the difference between the first and the second reference signal quality value may comprise registering the expiration of a transmission period, such as a transmission time interval for a WCDMA system.

The step of generating the filtered signal quality value in dependence of registering a difference between a first and a second reference signal quality value may comprise setting the filtered signal quality value equal to the estimated signal quality value if a difference between the first and second reference signal quality value is registered. Otherwise, the filtered signal quality value is generated based on the estimated signal quality value, a previously determined filtered signal quality value and a filter constant.

Generating the filtered signal quality value in dependence of registering a difference between a first and a second reference signal quality value may comprise generating the filtered signal quality value based on the estimated signal quality value, a previously determined filtered signal quality value, a filter constant and a quotient of a current reference signal quality value, which is valid for a current transmission period, to a preceding reference signal quality value, which was valid for the previous transmission time period, if a difference between the first and the second reference signal quality value is registered. Otherwise, the filtered signal quality value is generated based on the estimated signal quality value, the previously determined filtered signal quality value, and a filter constant.

Generating the filtered signal quality value in dependence of a registered change in transmitted power of said received signal may comprise generating said filtered signal quality value based on a previously issued transmit power control command and a power change value associated with said transmit power control command.

Generating the filtered signal quality value in dependence of a change in transmitted power of said received signal may also comprise adjusting a previously generated filtered signal quality value based on the value of a previously issued transmit power control command and the value of a power change value associated with the transmit power control command. Then, the filtered signal quality value is generated based on at least the estimated signal quality value and said adjusted previously generated filtered signal quality value.

Generating the filtered signal quality value may also comprise estimating the power change value. The power change value was used by a base station of the wireless communication system to adjust the transmitted power of said received signal in response to receiving from the communication apparatus the transmit power control command. The filtered signal quality value is thus generated based on the estimated power change value.

According to a second aspect of the invention, the objects are achieved by a power control device, which is configured to implement the method according to the invention.

Further embodiments of the invention are defined in the dependent claims.

It is an advantage of the method and the power control device that tight anti-windup bounds are allowed.

It is also an advantage that the bias between a reference signal quality value and a filtered signal quality value may be decreased, which allows the use of tight anti-windup bounds in order to enable fast anti windup detection and correctly generated transmit power control (TPC) commands.

It is an advantage of the invention that the filtered signal quality value is tracking the reference signal quality value more accurately. Thus, windup can be detected faster, whereby the power resources of the communication system are utilized well. Furthermore, it is another advantage of the invention that a generated TPC command, which is based on the filtered signal quality value according to the invention, will be more accurate, allowing for more efficient usage of the power resources of the communication system.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of embodiments of the invention, reference being made to the accompanying drawings, in which.

DETAILED DESCRIPTION OF EMBODIMENTS

Figure 2:
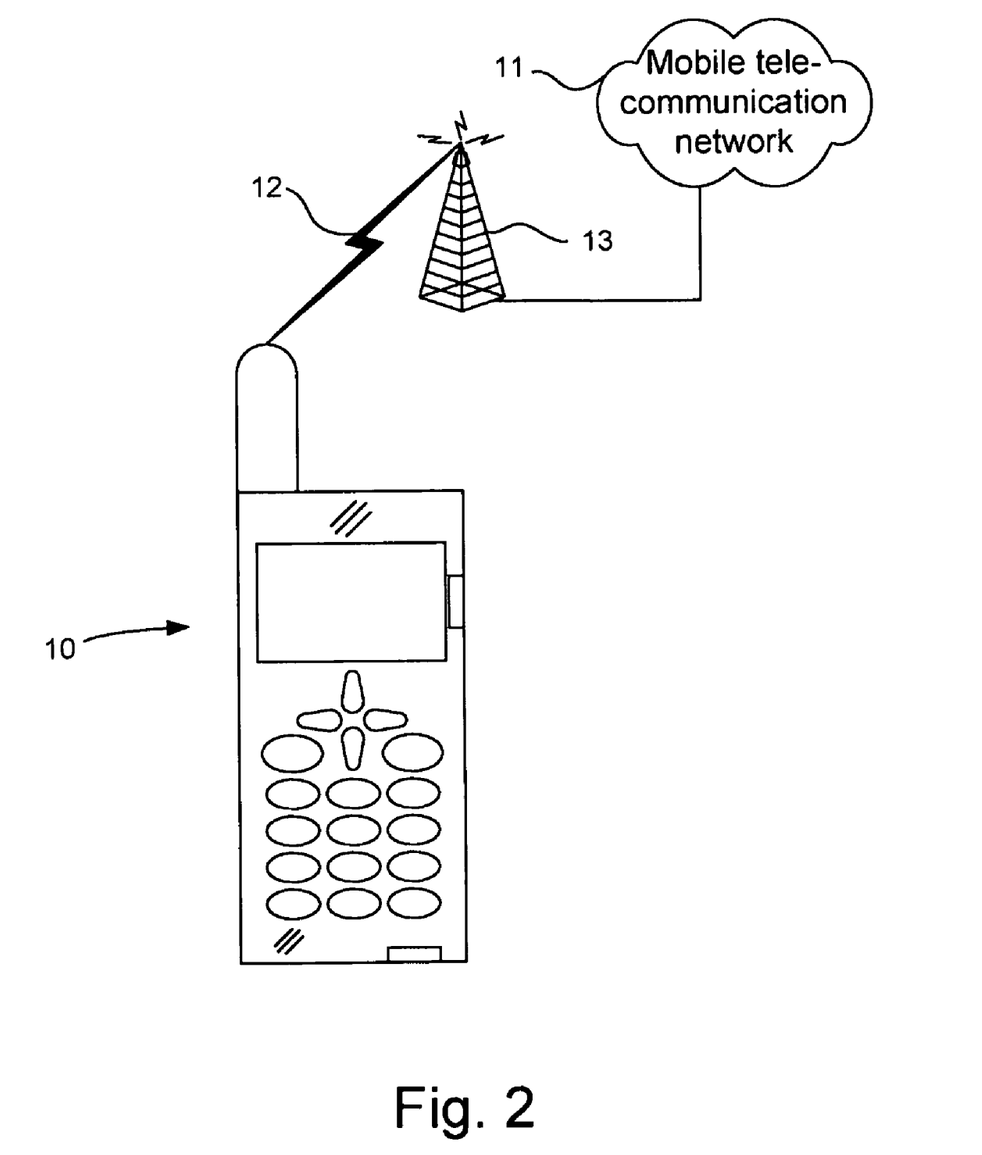
FIG. 2 is schematic view of a wireless communication apparatus and a portion of a wireless communication system.

FIG. 2 illustrates a user equipment embodied as a mobile telephone 10. The mobile telephone comprises various circuitry for wirelessly communicating data with a mobile telecommunication network 11 over a wireless communication link 12. A base station 13 of the mobile communication network is arranged to relay the communicated data. The communication network 11 may e.g. be a WCDMA (Wideband Code Division Multiple Access) network as specified according to the 3GPP ($3^{rd}$ Generation Partnership Project) standard.

The present invention is not limited to power control in a mobile telephone 10, but could also be implemented in e.g. a mobile radio terminal, a communicator, a smartphone, or any other electronic apparatus having a need for power control, such as an electronic organizer, a personal digital assistant having communication capabilities.

Figure 3:
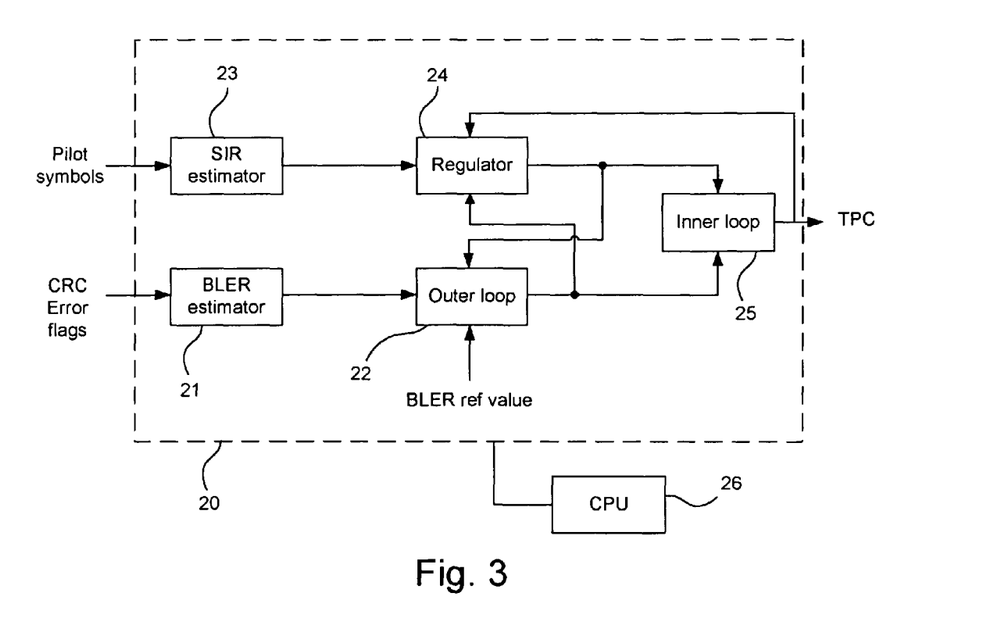
FIG. 3 is a block diagram a power control device.

To achieve a sufficient quality of signals transmitted over the communication link 12, the mobile telephone 10 comprises a power control device 20, as is illustrated in FIG. 3. The power control device 20 is arranged to output a TPC (Transmit Power Control) command, which is transmitted to the base station 13. The TPC command may e.g. be plus one to indicate that the power of the transmitted signal should be increased, or minus one to indicate that the power of the transmitted signal should be decreased. The base station 13 responds to the TPC command by either increasing or decreasing the transmitted power of the signals transmitted to the requesting mobile telephone 10 with a certain power change value. A similar power control is arranged for the downlink, where a power control device 20 is comprised in the base station 13, for controlling the power of the mobile device.

The power control device 20, as shown in FIG. 3, comprises a BLER estimator 21, which is arranged to estimate the block error rate of the received signal. The data sent in the uplink or downlink of the communication link 12 may be organized as follows; a number of data bits are collected in a transport block, several transport blocks are contained in a transmission time interval (TTI). In order to decode the data sent in the transport blocks the complete TTI must be received. Cyclic redundancy check (CRC) bits are added on each transport block. The CRC bits have special coding properties. Therefore, the BLER estimator 21 may determine whether the CRC bits are incorrect, which indicates that the bits in the transport block are almost certainly also decoded incorrectly, and vice versa. The BLER estimator 21 may therefore estimate the block error rate for a transport channel by filtering CRC error flags (CRCef), which are processed versions of the CRC bits. If the CRCef has a status of "set", the CRC bits are received in error, and vice versa.

An outer loop 22 is arranged to determine a reference signal-to-interference value, $SIR_{ref}$, based on the estimated block error rate determined by the BLER estimator 21 and a reference block error rate. The value of the reference block error rate may e.g. be set in dependence of the type of data transmitted over the communication link 12, such as voice data, an electronic message, information data transmitted over an information network, such as the Internet, and the mobile telephone. Depending on the type of data transmitted, the required quality of the communication link may be different, which may be set by the value of the reference block error rate. The value of the reference block error rate may e.g. be set by a processor 26 of the mobile telephone 1. The $SIR_{ref}$ value is set by the outer loop 22 such that the estimated block error rate should track the reference block error rate. If the block error rate is measured on basis of the TTI, the $SIR_{ref}$ will change at TTI boundaries, i.e. when a TTI has expired. However, if the estimated block error rate is updated otherwise, the $SIR_{ref}$ value may be updated in response to a change in such a estimated block error rate, and need not be associated with a TTI, but rather with a registered change in estimated block error rate.

A signal quality estimator 23 is arranged to estimate the quality of a received signal, e.g. based on pilot symbols of the received signal. One measure of the quality of the received signal is a signal-to-interference ratio (SIR) of said pilot symbols. Thus, in one embodiment, the signal quality estimator is an SIR estimator arranged to estimate an SIR value, $SIR_{est}$.

The signal quality estimator 23 is connected to a regulator 24 arranged to receive the $SIR_{est}$ values and to generate a $SIR_{filt}$ value, as will be explained below. The regulator 24 is configured to compensate for crossings of TTI boundaries, which may be indicated by changes in the $SIR_{ref}$ value, and/or changes in the transmitted power of the received signal. Thus, the bias between the $SIR_{ref}$ value and the $SIR_{filt}$ value may be reduced compared to the prior art power control device according to FIG. 1, thereby allowing for fast windup detection. The output of the regulator 24 is connected to an input of the outer loop 22, which is configured to detect windup based on the $SIR_{filt}$ value and the $SIR_{ref}$ value, e.g. as described in equation (1) based on the $SIR_{filt}$ value generated as described below. The output of the regulator 24 is further connected to an inner loop 25, which is configured to generate a TPC command based on the $SIR_{filt}$ value and the $SIR_{ref}$ value. If the $SIR_{filt}$ value is larger than the $SIR_{ref}$ value, the TPC should indicate a request for decreased transmitted power, and vice versa.

The inner loop may e.g. be updated at about 1500 Hz, which is once per slot, and the outer loop once per TTI, which is between about 10 and about 100 Hz, depending on the length of the TTI.

The power control device 20 may be implemented by software instructions, or by hardware, such as an application specific integrated circuit (ASIC) or a field programmable gate array (FPGA). Alternatively, the power control device may be implemented by a combination of software and hardware.

The power control device 20 may be connected to a processor 26, such as a central processing unit. The processor 26 may implement the power control device by running software code portions of a software program product stored in a memory of the mobile telephone 10.

According to one embodiment, the $SIR_{filt}$ value is generated based on either: the determination of the difference between a first and a second reference signal quality value; or an occurrence of change of transmitted power of a received signal. The first reference signal quality value may be valid for a first time period, and the second reference signal quality value may be valid for a second time period. The time period may be part of a transmission period. The time period may e.g. be a slot and the transmission period may e.g. be a transmission time interval (TTI) in a WCDMA communication system.

In the following, it is assumed that the $SIR_{est}$ value is compensated for any extra power that is transmitted by the base-station 13 in conjunction with frames before and after a transmission gap, and for the power offset between the pilot and data symbols on the DPCH (Dedicated Packet Channel).

The $SIR_{est}$ value can therefore be looked upon as an estimated SIR value under non-compressed transmission that models the SIR on the DPCH data symbols, which consequently simplifies the updating of the $SIR_{ref}$ value.

According to a first embodiment, the regulator 24 is configured to generate the $SIR_{filt}$ value based on an occurrence or a registration of a difference between a first and a second reference signal quality value. The outer loop 22 generates a new $SIR_{ref}$ value when a transmission time interval has expired. The output of the outer loop 22 is connected to the regulator 24 and the inner loop 25. The regulator 24 is configured to register the expiration of a transmission time interval. This may e.g. be done by registering that the $SIR_{ref}$ value is updated, e.g. in response to a new time transmission interval or a new estimated block error ratio. According to the first embodiment, the $SIR_{filt}$ value is reset at a TTI boundary, i.e. when it is registered that a first and a second reference signal quality value are different, i.e. $SIR_{ref,n} \neq SIR_{ref,n-1}$, wherein n denotes the current slot and n−1 the previous slot. When this registration is made, data has been received in a first slot of a TTI, and the previous TTI has expired. Then, the regulator 24 sets the filtered signal quality value equal to the estimated signal quality value, i.e.

$$SIR_{filt} = SIR_{est}$$

If the TTI has not expired, i.e. $SIR_{ref,n} = SIR_{ref,n} = SIR_{ref,n-1}$, the filtered signal quality value is generated based on the estimated signal quality value, a previously generated filtered signal quality value and a filter constant, i.e.

$$SIR_{filt,n} = \lambda_{SIR\_out}(SIR_{est} - SIR_{filt,n-1}) + SIR_{filt,n-1}$$

where the constant $\lambda_{SIR\_out}$ e.g. may be in the range of 0.1 and 0.5.

The $SIR_{filt}$ value is reset at TTI boundaries because around a TTI boundary the $SIR_{ref}$ value may change. By resetting the $SIR_{filt}$ value at a TTI boundary, the generated $SIR_{filt}$ value does not contain any samples made during the previous TTI. Thus, the $SIR_{filt}$ value will correspond more accurately to the current $SIR_{ref}$ value, whereby the bias between the generated $SIR_{filt}$ value and the current $SIR_{ref}$ value is decreased.

According to a second embodiment, the regulator 24 is configured to generate the filtered signal quality value in dependence of an occurrence of a difference between a first and a second reference signal quality value, i.e. $SIR_{ref,n} \neq SIR_{ref,n-1}$, where n denotes slot number n and n−1 the previous slot for a given transport channel. If the TTI has expired, the filtered signal quality value is in this embodiment based on the estimated signal quality value, a previously determined filtered signal quality value, a filter constant and a quotient between on one hand a current reference signal quality value, which is valid for a current transmission time interval, and on the other hand a preceding reference signal quality value, which was valid for the previous transmission time interval:

$$SIR_{filt,n} = \lambda_{SIR\_out}(SIR_{est,n} - \rho SIR_{filt,n-1}) + \rho SIR_{filt,n-1},$$

$$\rho = \frac{SIR_{ref,n}}{SIR_{ref,n-1}}$$

However, if the TTI has not expired, i.e. $SIR_{ref,n} = SIR_{ref,n} = SIR_{ref,n-1}$, the filtered signal quality value is determined based on the estimated signal quality value, a previously determined filtered signal quality value, and a filter constant:

$$SIR_{filt,n} = \lambda_{SIR\_out}(SIR_{est,n} - SIR_{filt,n-1}) + SIR_{filt,n-1}.$$

The constant $\lambda_{SIR\_out}$ may be within the range of 0.01 to 0.1 to obtain a satisfactory $SIR_{filt}$ value. The gain factor $\rho$ is to compensate for changing $SIR_{ref}$ values at TTI boundaries. This adjusts the previous $SIR_{filt}$ value, $SIR_{filt,n-1}$, to map to the latest generated $SIR_{ref}$ value and be independent of any previous $SIR_{ref}$ value. Consequently, the bias between the generated $SIR_{filt}$ value and the current $SIR_{ref}$ value is decreased and the constants c1 and c2 in equation (1) as applied by the outer loop 22 may be chosen closer to unity, and windup detection may be provided faster. Also, TPC commands may be generated more accurately by the inner loop 25.

According to a third embodiment, the regulator 24 is configured to determine the $SIR_{filt}$ value in dependence of a change in transmitted power of the received signal. The $SIR_{filt}$ value is based on a previously issued transmit power control command and a power change value associated with said transmit power control command, in addition to the $SIR_{est}$ value and a previously generated $SIR_{filt}$ value. The $SIR_{filt}$ value may be generated as:

$$SIR_{filt,n} = \lambda_{SIR\_in}(SIR_{est,n} - 10^{0.1 \cdot TPC_{command} \cdot \Delta TPC} SIR_{filt,n-1}) + 10^{0.1 \cdot TPC_{command} \cdot \Delta TPC} SIR_{filt,n-1}.$$

The value of the parameter $TPC_{command}$ and corresponds to the value of the TPC command transmitted to the base station 13 in the previous slot, n−1, which e.g. may be plus one if more power was requested and minus one if less power was requested. The constant $\Delta_{TPC}$ is the step size of the power change value being an increment or decrement of transmitted power done in the base station. This step size is not known by the mobile telephone 10, but can be estimated or set to a minimum value for a conservative adjustment of the $SIR_{filt}$ value. The minimum value of $\Delta_{TPC}$ may e.g. selected in the range of 0.1-2, but has to be tested and evaluated for each particular implementation. A may be estimated e.g. as described in European patent application no. EP-1480350. Alternatively, the step size $\Delta_{TPC}$ can be adjusted to maximize the performance of the outer loop 22 in some sense, that is, it is not limited to be set to the size of the power change value. As a measure of the performance of the outer loop 22, its performance could be maximized in some sense, that is, it is not limited to be set to the size of the power change value. As a measure of the performance of the outer loop 22, $\Delta_{TPC}$ may be tuned such that it gives the best average performance for a set of cells and propagation channels. By adjusting for changes in the transmitted power, the generated $SIR_{filt}$ value may more accurately map to the $SIR_{ref}$ value as it is based on the present power values and not influenced by old values. Thus, the bias between the $SIR_{filt}$ value and the $SIR_{ref}$ value may be reduced and the windup detection may be made more accurate. Also, the inner loop 25 may generate more accurate TPC commands.

According to a fourth embodiment, the $SIR_{filt}$ value is generated by the regulator 24 based on a combination of an occurrence of a difference between a first and a second reference signal quality value and a change in transmitted power of the received signal. According to this embodiment, if it is determined that $SIR_{ref,n} = SIR_{ref,n-1}$, the $SIR_{filt}$ value is determined as:

$$SIR_{filt,n} = \lambda_{SIR\_in}(SIR_{est,n} - 10^{0.1 \cdot TPC_{command} \cdot \Delta TPC} SIR_{filt,n-1}) + 10^{0.1 \cdot TPC_{command} \cdot \Delta TPC} SIR_{filt,n-1},$$

i.e. corresponding to the third embodiment. However, if it is determined that $SIR_{ref,n} \neq SIR_{ref,n-1}$, the $SIR_{filt}$ value is determined as:

$$SIR_{filt,n} = \lambda_{SIR\_in}(SIR_{est,n} - 10^{0.1 \cdot TPC_{command} \cdot \Delta_{TPC}} \rho SIR_{filt,n-1}) +$$
$$10^{0.1 \cdot TPC_{command} \cdot \Delta_{TPC}} \rho SIR_{filt,n-1},$$

$$\rho = \frac{SIR_{ref,n}}{SIR_{ref,n-1}},$$

wherein the parameters in this embodiment correspond to corresponding parameters as described above. Consequently, according to the fourth embodiment, the $SIR_{filt}$ value is adjusted to compensate for changes in the $SIR_{ref}$ value as well as in the transmitted power.

Assuming 1) that the power requested by the TPC command is granted and 2) that the radio channel is approximately constant for the time constant given by the filter parameter $\lambda_{SIR\_in}$, compensating the previous $SIR_{filt}$ value with the power lap or down commands makes the current $SIR_{filt}$ value look like the instantaneous SIR, but with much less variance in its estimate. From simulations it can be shown that the bias between the $SIR_{filt}$ and $SIR_{ref}$ values is directly related to the amount of variance in the $SIR_{est}$ value. Less variance in the $SIR_{filt}$ value used in the inner loop will also improve the performance of the power control, that is, less transmitted power from the base-stations is needed if the bias between the generated $SIR_{filt}$ value and the current $SIR_{ref}$ value is decreased. Assumption 1) is difficult to verify, but can be compensated for by selecting a conservative estimate for $\Delta_{TPC}$, and assumption 2) can be checked by using a Doppler estimator. In a system, there will be errors in the decoding of the TPC commands at the base-station(s), which will result in that the wrong power adjustment is transmitted in the next slot. Most of the time the decoding is done properly—errors are in the order of 1 to 10 percent—and therefore occasional erroneously decoded TPC commands will not influence the benefits with including the adjustment for power change values.

The regulator 24 may also be configured to perform the filtering in the logarithmic domain, i.e. on the logarithm of the $SIR_{est}$ value. Then, the $SIR_{ref}$ value in decibels (according to the third and fourth embodiments) may be determined as:

If $SIR_{ref,n} \neq SIR_{ref,n-1}$:

$$SIR_{filt,n,dB} = \lambda_{SIR\_in}\begin{pmatrix} SIR_{est,n,dB} - TPC_{command}\Delta_{TPC} - \\ 10\log_{10}\rho - SIR_{filt,n-1,dB} \end{pmatrix} +$$
$$TPC_{command}\Delta_{TPC} + \log_{10}\rho + SIR_{filt,n-1,dB},$$

$$\rho = \frac{SIR_{ref,n}}{SIR_{ref,n-1}}$$

If $SIR_{ref,n} = SIR_{ref,n-1}$:

$SIR_{filt,n,dB} = \lambda_{SIR\_in}(SIR_{est,dB} - TPC_{command}\Delta_{TPC} - SIR_{filt,n-1,dB}) + TPC_{command}\Delta_{TPC} + SIR_{filt,n-1,dB}$ The $SIR_{filt}$ value generated according to the embodiments above may be utilized by the outer and the inner loops 22, 25. Adjusting the $SIR_{filt}$ value according, e.g., according to this embodiment, is beneficial both for the outer and the inner loop 22, 25. For the outer loop 22, a decreased bias means that windup may be detected earlier, wherein updating of the $SIR_{ref}$ value may be stopped. For the inner loop 25, the $SIR_{filt}$ value may track the $SIR_{ref}$ value more accurately, wherein more accurate TPC commands may be generated. For both cases, the power resources in the communication system is utilized more efficiently. However, the adjusted $SIR_{filt}$ need not be utilized in both the outer and the inner loops 22, 25. A $SIR_{filt}$ value generated as in equation (2), e.g. by the signal quality estimator 23, may be used in either of the outer or the inner loops 22, 25, whereas an adjusted $SIR_{filt}$ value may be utilized in the other and still improve the utilization of the power resources of the communication system. Of course, utilizing the adjusted $SIR_{filt}$ value in both the outer and the inner loop 22, 25 will provide a better result than only utilizing it in one of them.

It is also possible to turn off the windup check in the outer loop 22. When the $SIR_{filt}$ value is lower than a prescribed threshold, $\tau_{SIR}$, it is possible to omit checking for windup, such as described by equation (1). This is to avoid triggering windup when there is no windup. The threshold may be set such that it reflects when the quantization noise becomes a significant factor in the variance of the $SIR_{filt}$ value. When this is the case, the $SIR_{filt}$ value may be of such poor quality that the bias estimation methods described above do little to alleviate any potential bias existing in the estimate. The threshold, $\tau_{SIR}$, is highly implementation dependent.

Figure 4A:
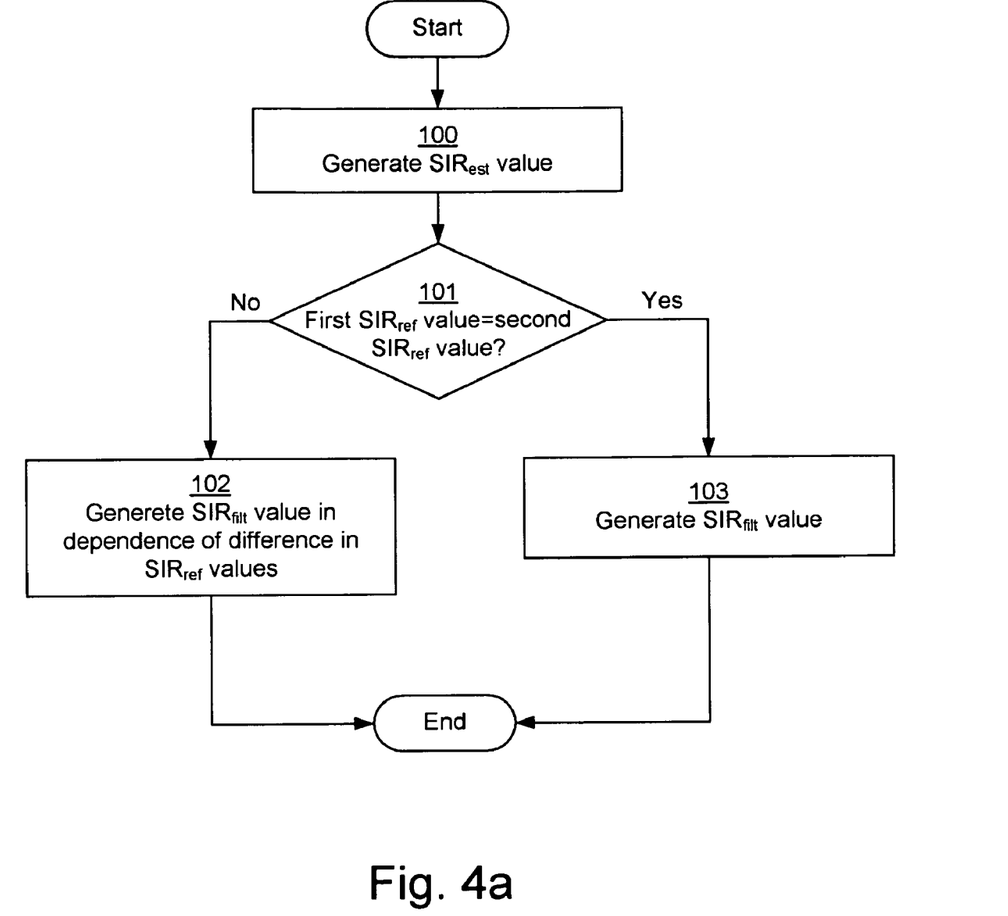
FIG. 4a is a flow-chart of an embodiment of the method according to the invention.

FIG. 4a is a flowchart of one embodiment of the method according to the invention. In a first step 100, the $SIR_{est}$ value is generated by the signal quality estimator 23. In step 101, it is determined whether a first reference signal quality value, which is valid for a current slot, is equal to a second reference signal quality value valid for a previous slot of a received signal. If the answer in step 101 is yes, i.e. the first and second reference signal quality values are equal, the procedure proceeds to step 103. If the answer in step 101 is no, i.e. a difference between the first and the second signal quality values is registered, the procedure proceeds to step 102. In step 102, the $SIR_{filt}$ value is generated and compensated for a different signal quality value in response to the registered difference of the first and second reference signal quality values, e.g. as described above. In step 103, the $SIR_{filt}$ value is generated without any adjustment for a difference between the first and second signal quality value, e.g. as in the above-described embodiments.

Figure 4B:
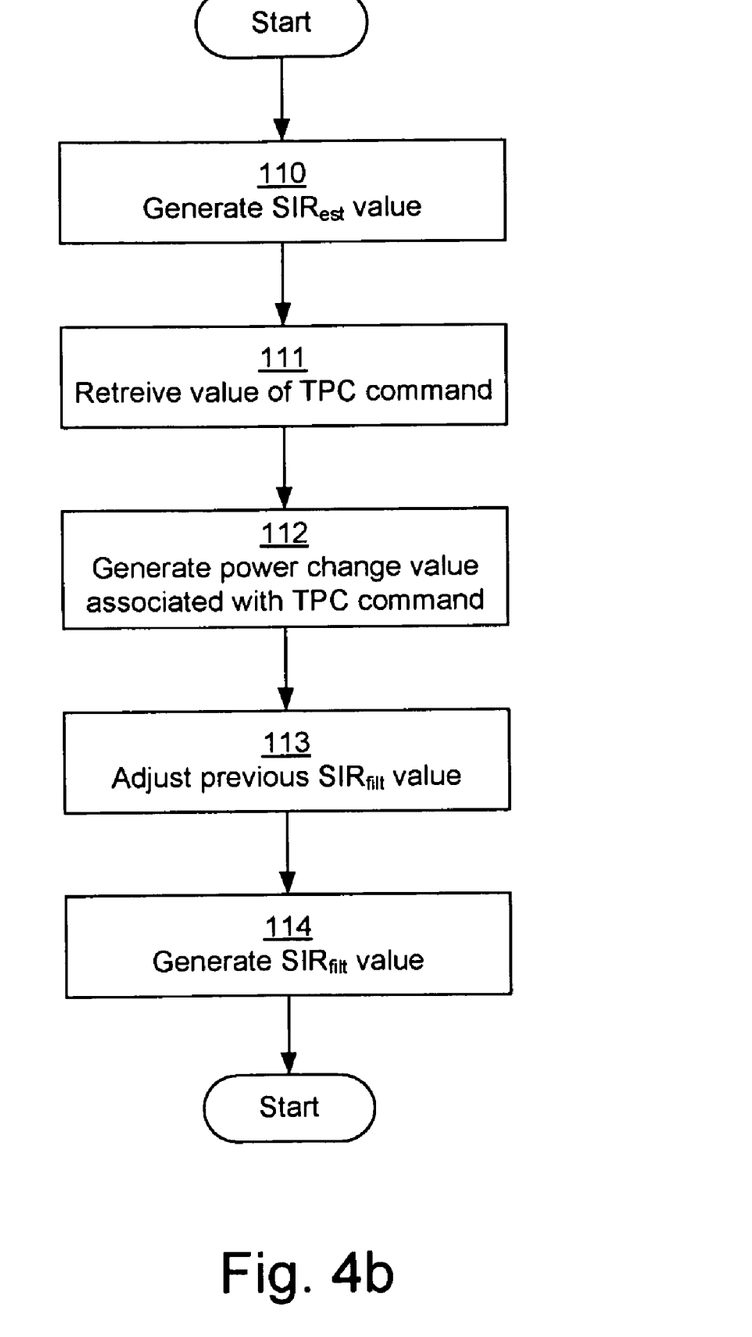
FIG. 4b is another embodiment of the method according to the invention.

FIG. 4b illustrates another embodiment of the method according to the invention. In a first step 110, the $SIR_{est}$ value is generated. In step 111, the value of the previously issued TPC command is retrieved from a memory, in which it temporarily may be stored. In step 112, the power change value associated with the retrieved TPC command is estimated, or retrieved from the memory if it is a fixed value. In step 113, the previously generated $SIR_{filt}$ value is adjusted based on the value of the TPC command and the associated power change value. In step 114, the $SIR_{filt}$ value of the current slot is generated based on the adjusted previous $SIR_{filt}$ value and the $SIR_{est}$ value.

According to another embodiment of the method according to the invention, the methods according to FIGS. 4a and 4b are combined. Then, a subroutine may be started in steps 102 and 103 and the routine according to steps 110-114 may be run, wherein the $SIR_{filt}$ value is generated based on both a registered difference between the first and the second reference signal quality values, and a registered change in transmitted power.

Figure 5:
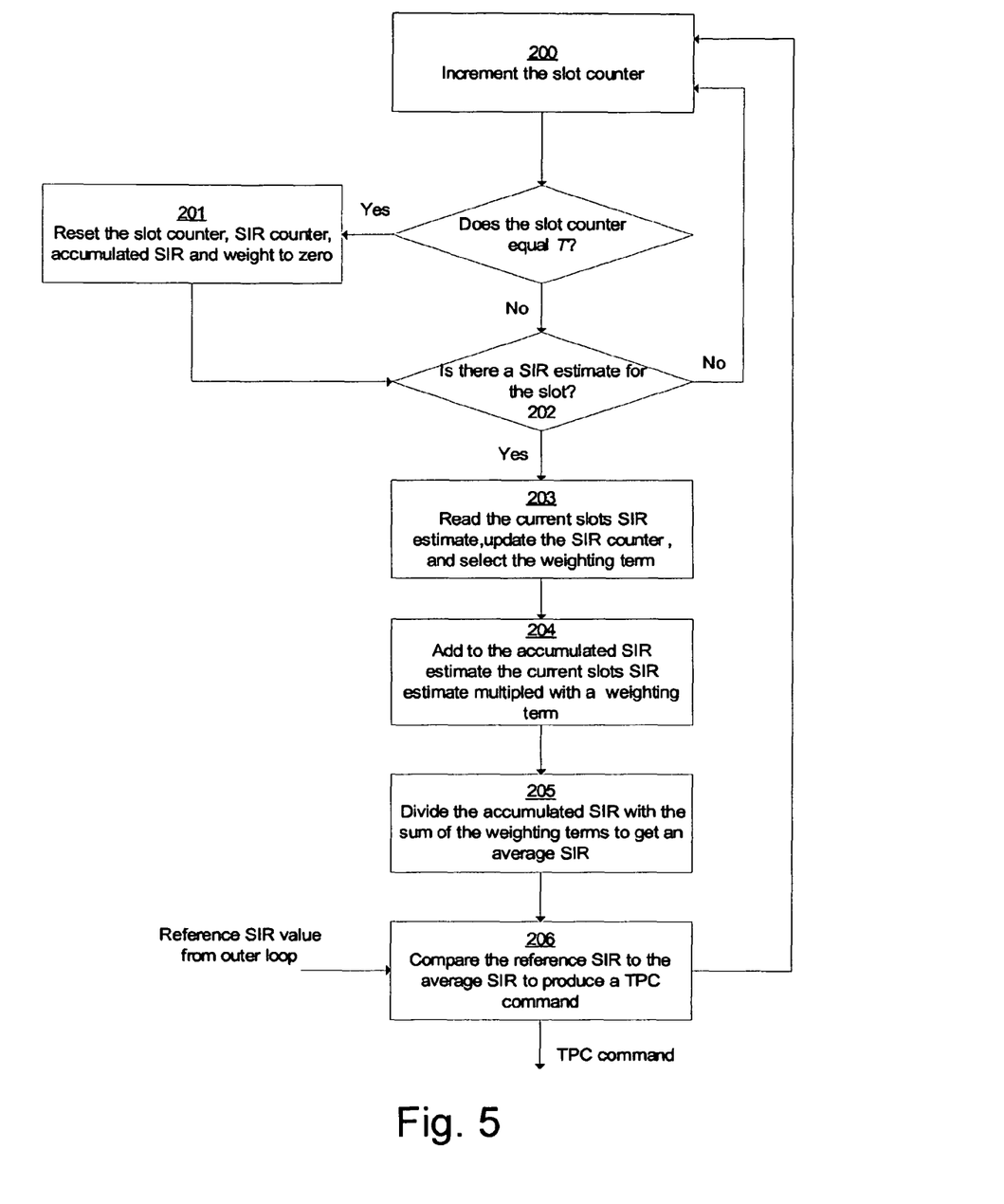
FIG. 5 is a flow-chart of an alternative method for generating a filtered signal quality value.

FIG. 5 illustrates an alternative method, which involves an improved inner loop method. It should be noted, that the $SIR_{ref}$ value stays constant at least one frame, where one frame contains a number of slots, such as 15 for WCDMA. To be more exact it stays constant for the duration of the smallest TTI, which could be 1, 2, 4, or 8 frames.

In block 200 a slot counter $n_{slot}$ is introduced. The slot counter runs from zero up to T. Once it reaches T it is reset to zero again. T may be chosen so that the number of slots per the smallest TTI divided by T is equal an integer number. The value of T may e.g. be chosen to be 3 or 5 if the number of slots per frame is 15 and the smallest TTI contains one frame.

When the slot counter has been incremented, a check is performed to see if the value of $n_{slot}$ has reached T.

In block 201, if the counter has reached T, the slot counter and a SIR counter, $n_{SIR}$, is reset to zero, $n_{slot}=n_{SIR}=0$, and an accumulated SIR and a weight value is set to zero, $SIR_{acc}=w_{acc}=0$, respectively. A check is then performed in block 202 to see if there is a SIR estimate available. This may for example be the case in transmission gaps during compressed mode there will be no available SIR estimates. If the answer in block 202 is yes, the procedure proceeds to block 203, otherwise it is returned to step 200.

In block 203 the $SIR_{est}$ value of the current slot is read, and $n_{SIR}$ is incremented by one. Here, $n_{SIR}$ keeps track of how many SIR estimates have been received during the cycle of T slots. A weight, $w_{nSIR}$, which depends on T, is also chosen, as will be described below.

In block 204, the $SIR_{est}$ value of the current slot times $w_{nSIR}$ is added to an accumulated SIR value, that is, $$SIR_{acc,n}=SIR_{acc,n-1}+w_{nSIR}SIR_{est,n}.$$

Also an accumulated weight value $w_{acc,n}$ is updated, that is $$w_{acc,n}=w_{acc,n-1}w_{nSIR}.$$

In block 205, an average SIR value $SIR_{avg}$ is generated based on the accumulated SIR and weight values, that is, $$SIR_{avg}=\frac{SIR_{acc}}{w_{acc}}.$$

In block 206, the TPC command is generated, that is, the TPC command is down (−1) if the $SIR_{avg}$ value is greater than the $SIR_{ref}$ value and up (+1) if the $SIR_{ref}$ value is greater than $SIR_{avg}$ value. Then, the procedure returns to block 200.

It should be noticed that the variable $SIR_{avg}$ is approximately an average value over a number of $SIR_{est}$ values, the number being dependent on T.

The values of $w_{nSIR}$ could be chosen uniformly, i.e. $w_{nSIR}=1$. Alternatively, the values of $w_{nSIR}$ could be chosen such that the last estimate is always accounting for 20-40% of the total contribution to the $SIR_{avg}$ value. This method reduces the bias between the $SIR_{ref}$ value and the $SIR_{avg}$ value, which may be used in the outer and inner loops 22, 25 instead of the $SIR_{filt}$ value as described above.

According to an alternative method the signal quality values used in the outer loop 22 may be adjusted in an alternative way. The $SIR_{est}$ and the $SIR_{ref}$ values may be filtered over the same time span. The filtering should approximately equal a moving average of 10 to 40 samples. If the filtered values are called $SIR_{est,filt}$ and $SIR_{ref,filt}$, the bias may then be computed as:

$$\beta=SIR_{est,filt}-SIR_{ref,filt}.$$

The bias β is then used to change the anti-windup statement in equation (1) to $$c_2(\beta+SIR_{ref})<SIR_{filt}<c_1(\beta+SIR_{ref}).$$

$SIR_{est,filt}$ and $SIR_{ref,filt}$ may e.g. be generated by a first order recursive filter, such as a IIR filter.

From hereon, the inner loop can be configured as in the prior art. The updating of the bias should be stopped as soon as windup is detected and restarted once the anti-windup statements are passed again.

According to still an alternative method, the inner loop 25 is run by using the $SIR_{est}$ value but the averaged SIR values or filtered SIR values are computed as described above, with the purpose of evaluating the bias by comparing fictitious TPC commands generated by the $SIR_{filt}/SIR_{avg}$ values to TPC commands generated by the $SIR_{est}$ values. From the correlation of the two generated TPC commands, the bias can be estimated. This method may be used if large limit cycles is undesirable, that is, the time it takes for the inner loop 25 to react on fading conditions, when the inner loop 25 is controlled by $SIR_{filt}/SIR_{avg}$ values as described above.

Let the TPC commands that are generated by the inner loop 25 be denoted $TPC_n$ where n enumerates the number of slots. An additional TPC command, $TPC_n^{fict}$, which is never used to control the base-station transmit power, is computed using the $SIR_{filt}/SIR_{avg}$ value. $TPC_n^{fict}$ is computed to compare the difference in the TPC generation using the $SIR_{est}$ or the $SIR_{filt}/SIR_{avg}$ values. Next, the difference in TPC commands is filtered and the result is called $\Delta_{filt,n}^{TPC}$, that is, $$\Delta_n^{TPC}=TPC_n-TPC_n^{fict},$$

$$\Delta_{filt,n}^{TPC}=\lambda_{TPC}(\Delta_n^{TPC}-\Delta_{filt,n}^{TPC})+\Delta_{filt,n}^{TPC}. \quad (3)$$

Here, the filtering factor $\lambda_{TPC}$ should correspond to about 30 to 100 slot samples, that is $\lambda_{TPC} \in [0.01, 0.03]$. In general, the time constant in the filtering of $\Delta_{filt,n}^{TPC}$ should be approximately four times larger than the time constant used in the filtering of the $SIR_{est}$ values, which is described above. The TPC commands are assumed to be plus one or minus one, with plus one meaning that more transmit power is requested, and vice versa.

From extensive simulation data, it can be seen that there is a relationship between $\Delta_{filt,n}^{TPC}$ and the bias β given by $$10\log_{10}\frac{SIR_{filt}}{SIR_{ref}}=k\cdot\Delta_{filt,n}^{TPC}. \quad (4)$$

Here, k is a constant that depends on the period T described above in relation to FIG. 5 or the filtering factor $\lambda_{SIR\_out}$ used for generating the $SIR_{filt}$ value in the first embodiment. The left-hand side of equation (4) is the definition of the bias in logarithmic scale. Using values of T=5 or $\lambda_{SIR\_out}=0.25$, k should be chosen as 9 when the T=5 is used and as 4.5 when $\lambda_{SIR\_out}=0.25$.

It should be observed that the updating of $\Delta_{filt,n}^{TPC}$ should be frozen as soon as windup is detected to prevent the bias estimate from being corrupted. From equation (4), the $SIR_{filt}$ value, which is used in the anti-windup statements in equation (1), may be adjusted as $$\max(L,\min(K,10^{0.1k\cdot\Delta_{filt,n}^{TPC}}))\cdot SIR_{filt}.$$

Here, the $SIR_{filt}$ value can be computed as in equation (2) or as in the second embodiment, and K is a factor to bind the influence of the bias correction. K may be equal to 2, since rarely the bias exceeds 3 dB, and L may be equal to 0.8 (−1 dB). However, other values are possible and need to be tested and evaluated in each specific case.

At start-up, the inner loop 25 could be run based on the $SIR_{filt}/SIR_{avg}$ value, and compute the $\Delta_{filt,n}^{TPC}$ value. Running the inner loop 25 based on the $SIR_{filt}/SIR_{avg}$ value will mitigate the bias. However, note that above the prerequisite for computing $\Delta_{filt,n}^{TPC}$ was that the inner loop 25 was run based on the $SIR_{est}$ value. However, simulations show that there is some symmetry, meaning that even though the inner loop 25 is run based on the $SIR_{filt}/SIR_{avg}$ value $\Delta_{filt,n}^{TPC}$ can still be estimated as in equation (3) after correction with constant factor $k_{init}$. Here, $k_{init}$ depends on the period T or the filtering factor $\lambda_{SIR\_in}$, where $k_{init}$ equal to 2 fits with T=5 or $\lambda_{SIR\_in}$ 0.25. After a given warm-up time, for example $\Delta_{filt,n}^{TPC}$ should have been updated with at least $1/\lambda_{TPC}$ samples, the inner loop 25 is switched to run using the $SIR_{est}$ value, and the bias is estimated using $\Delta_{filt,n}^{TPC}$ as described above.

The filtering in equation (3) could be replaced by a moving average. The drawback of this is that more data needs to be stored. The benefits are the following; 1) the amount of data influencing the difference in TPC commands is exactly known; 2) when windup is encountered, except from stopping the update of the difference in TPC commands, the already stored values that are deemed to be produced during windup detection can also be removed from memory. The last statement is the result of the filtering of the SIR values used in the detection of windup, that is, it will take some time, on the order of $1/\lambda_{SIR\_in}$ samples, before windup is detected. These samples can be removed from the memory used in generating the difference in TPC commands. The result is a better bias estimator.

Reference has been made to a slot above. However, the invention is not limited to a slot. Any time frame similar to a slot may be utilized according to the invention. Furthermore, reference to a transmission time interval has been made above. However, the invention is not limited to a transmission time interval of a WCDMA system, but can be implemented in any system with a similar time interval in which data are transmitted.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for generating a filtered signal quality value for use in a power control system of a wireless communication apparatus, comprising:
   generating an estimated signal quality value of at least one received signal; and
   generating a filtered signal quality value based on the estimated signal quality value,
   wherein the filtered signal quality value is generated in dependence of at least one feature selected from the group of:
   an occurrence of a difference between a first and a second reference signal quality value valid for a first and a second time period, respectively, of said at least one received signal, and
   a change in transmitted power of said at least one received signal,
   wherein the occurrence of the difference between the first and the second reference signal quality value is registered by a process that comprises registering an expiration of a transmission period.

2. The method according to claim 1, wherein the time period is a slot of a WCDMA communication system.

3. The method according to claim 1, wherein the transmission period is a transmission time interval of a WCDMA communication system.

4. A method for generating a filtered signal quality value for use in a power control system of a wireless communication apparatus, comprising:
   generating an estimated signal quality value of at least one received signal; and
   generating a filtered signal quality value based on the estimated signal quality value,
   wherein the filtered signal quality value is generated in dependence of at least one feature selected from the group of:
   an occurrence of a difference between a first and a second reference signal quality value valid for a first and a second time period, respectively, of said at least one received signal, and
   a change in transmitted power of said at least one received signal,
   wherein the step of generating the filtered signal quality value in dependence of registering a difference between a first and a second reference signal quality value comprises:
   setting the filtered signal quality value equal to the estimated signal quality value if a difference between the first and second reference signal quality value is registered; otherwise
   generating the filtered signal quality value based on the estimated signal quality value, a previously determined filtered signal quality value and a filter constant.

5. The method according to claim 4, comprising adjusting the previously generated filtered signal quality value by multiplying it with $10^{0.1 \cdot TPC \cdot \Delta_{TPC}}$, wherein TPC is the value of said transmit power control command and $\Delta_{TPC}$ is the value of said power change value.

6. A method for generating a filtered signal quality value for use in a power control system of a wireless communication apparatus, comprising:
   generating an estimated signal quality value of at least one received signal; and
   generating a filtered signal quality value based on the estimated signal quality value,
   wherein the filtered signal quality value is generated in dependence of at least one feature selected from the group of:
   an occurrence of a difference between a first and a second reference signal quality value valid for a first and a second time period, respectively, of said at least one received signal, and
   a change in transmitted power of said at least one received signal,
   wherein the step of generating the filtered signal quality value in dependence of registering a difference between a first and a second reference signal quality value comprises:
   generating the filtered signal quality value based on the estimated signal quality value, a previously determined filtered signal quality value, a filter constant and a quotient of a current reference signal quality value, which is valid for a current transmission period, to a preceding reference signal quality value, which was valid for the previous transmission period, if a difference between the first and the second reference signal quality value is registered; otherwise
   generating the filtered signal quality value based on the estimated signal quality value, the previously determined filtered signal quality value, and a filter constant.

7. A method for generating a filtered signal quality value for use in a power control system of a wireless communication apparatus, comprising:
   generating an estimated signal quality value of at least one received signal; and
   generating a filtered signal quality value based on the estimated signal quality value, wherein the filtered signal quality value is generated in dependence of at least one feature selected from the group of:
an occurrence of a difference between a first and a second reference signal quality value valid for a first and a second time period, respectively, of said at least one received signal, and
a change in transmitted power of said at least one received signal,
wherein the step of generating the filtered signal quality value in dependence of a change in transmitted power of said received signal comprises:
generating said filtered signal quality value based on a previously issued transmit power control command and a power change value associated with said transmit power control command.

8. The method according to claim 7, wherein the step of generating the filtered signal quality value in dependence of a change in transmitted power of said received signal further comprises:
adjusting a previously generated filtered signal quality value based on the value of a previously issued transmit power control command and the value of a power change value associated with the transmit power control command; and
generating the filtered signal quality value based on at least the estimated signal quality value and said adjusted previously generated filtered signal quality value.

9. The method according to claim 7, wherein the step of generating the filtered signal quality value comprises estimating the power change value, which was used by a transmitting part of the wireless communication system to adjust the transmitted power of said received signal in response to receiving from said communication apparatus said transmit power control command, and generating the filtered signal quality value based on the estimated power change value.

10. The method according to claim 7, comprising utilizing a fixed value as the power change value.

11. The method according to claim 10, comprising selecting the fixed value in the range of 0.1-2 dB.

12. A power control device for generating a filtered signal quality value, comprising:
a signal quality estimator configured to generate an estimated signal quality value of at least one received signal; and
a regulator configured to generate a filtered signal quality value based on the estimated signal quality value,
wherein the regulator is configured to register at least one of a difference between a first and a second reference signal quality value being valid for a first and a second time period, respectively, and an occurrence of a change in transmitted power of said received signals, and configured to generate the filtered signal quality value in dependence of at least one of said registered difference between the first and the second reference signal quality value of said at least one received signal and said registered change in transmitted power of said at least one received signal.

13. The power control device according to claim 12, wherein the regulator is configured to register the expiration of a transmission period, which is indicated by a difference between said first and second reference signal quality value.

14. The power control device according to claim 13, wherein the transmission period is transmission time interval of a WCDMA communication system.

15. The power control device according to claim 12, wherein the regulator is configured to generate the filtered signal quality value in dependence of a registered difference between the first and the second reference signal quality value, and further configured to:
set the filtered signal quality value equal to the estimated signal quality value if a difference between the first and second reference signal quality value is registered; otherwise
generate the filtered signal quality value based on the estimated signal quality value, a previously determined filtered signal quality value and a filter constant.

16. The power control device according to claim 12, wherein the regulator is configured to generate the filtered signal quality value in dependence of a registered difference between the first and the second reference signal quality value, and further configured to:
generate the filtered signal quality value based on the estimated signal quality value, a previously determined filtered signal quality value, a filter constant and a quotient of a current reference signal quality value, which is valid for a current time period, to a preceding reference signal quality value, which was valid for a previous time period, if a difference between the first and the second reference signal quality value is registered; otherwise
generate the filtered signal quality value based on the estimated signal quality value, the previously generated filtered signal quality value, and a filter constant.

17. The power control device according to claim 12, wherein the regulator is configured to generate the filtered signal quality value in dependence of a registered change in transmitted power of said received signal, the regulator further being configured to:
generate said filtered signal quality value based on a previously issued transmit power control command and a power change value associated with said transmit power control command.

18. The power control device according to claim 17, wherein the regulator is configured to generate the filtered signal quality value in dependence of a registered change in transmitted power of said received signal, and further configured to:
adjust a previously generated filtered signal quality value based on the value of a previously issued transmit power control command and the value of a power change value associated with said transmit power control command; and
generate the filtered signal quality value based on at least the estimated signal quality value and said adjusted previously generated filtered signal quality value.

19. The power control device according to claim 18, wherein the regulator is configured to utilize a fixed value as the power change value.

20. The power control device according to claim 19, wherein regulator is configured to select the fixed value in the range of 0.1-2 dB.

21. The power control device according to claim 17, wherein the regulator further is configured to estimate the power change value, which was used by a transmitting part of the wireless communication system to adjust the transmitted power of said received signal in response to receiving from said power control device said transmit power control command, and adjust the filtered signal quality value based on the estimated power change value.

22. The power control device according to claim 21, wherein the regulator is configured to adjust the previously generated filtered signal quality value by multiplying it with:

$10^{0.1 \cdot TPC \cdot \Delta_{TPC}}$, wherein TPC is the value of said transmit power control command and $\Delta_{TPC}$ is the value of said power change value.

23. The power control device according to claim 12, wherein the time period is a slot of a WCDMA communication system.

24. A non-transitory computer readable medium comprising computer program code means to execute a method when said computer program code means are run by an electronic device having computer capabilities, said method comprising:
  generating an estimated signal quality value of at least one received signal; and
  generating a filtered signal quality value based on the estimated signal quality value,
  wherein the filtered signal quality value is generated in dependence of at least one feature selected from the group of:
  an occurrence of a difference between a first and a second reference signal quality value valid for a first and a second time period, respectively, of said at least one received signal, and
  a change in transmitted power of said at least one received signal,
  wherein the occurrence of the difference between the first and the second reference signal quality value is registered by a process that comprises registering an expiration of a transmission period.

25. A wireless communication apparatus comprising a power control device according to claim 12.

26. The wireless communication apparatus according to claim 25, wherein the wireless communication apparatus is a radio terminal, a communicator, an organizer or a personal digital assistant having communication capabilities.

27. The wireless communication apparatus according to claim 25, wherein the wireless communication apparatus is a mobile telephone.

28. The wireless communication apparatus according to claim 25, wherein the wireless communication apparatus is a base station.

* * * * *

UNITED STATES PATENT AND TRADEMARK OFFICE
CERTIFICATE OF CORRECTION

PATENT NO. : 8,385,965 B2
APPLICATION NO. : 11/721938
DATED : February 26, 2013
INVENTOR(S) : Jonsson et al.

It is certified that error appears in the above-identified patent and that said Letters Patent is hereby corrected as shown below:

In the Specification

In Column 7, Line 26, delete "$SIR_{ref,n}=SIR_{ref,n}=SIR_{ref,n-1}$," and insert -- $SIR_{ref,n}=SIR_{ref,n-1}$, --, therefor.

In Column 7, Lines 62-63, delete "$SIR_{ref,n}=SIR_{ref,n}=SIR_{ref,n-1}$," and insert -- $SIR_{ref,n}=SIR_{ref,n-1}$, --, therefor.

In Column 8, Line 24, delete "$TPC_{command}$ and" and insert -- $TPC_{command}$ --, therefor.

In Column 8, Line 36, delete "A may" and insert -- $\Delta_{TPC}$ may --, therefor.

In Column 9, Line 17, delete "power lap" and insert -- power up --, therefor.

In Column 11, Line 67, delete "$SIR_{est}$," and insert -- $SIR_{est}$ --, therefor.

In Column 12, Line 11, delete "$TPC_n$," and insert -- $TPC_n$, --, therefor.

Signed and Sealed this
Ninth Day of July, 2013

Teresa Stanek Rea
*Acting Director of the United States Patent and Trademark Office*